April 16, 1946.   D. H. ROGERS ET AL   2,398,721
DEVICE FOR ADJUSTABLY SPACING MEMBERS Filed April 1, 1944

INVENTORS
D.H. ROGERS
V. SCHILHA
BY
E.R. Nowlan
ATTORNEY

Patented Apr. 16, 1946

2,398,721

UNITED STATES PATENT OFFICE 2,398,721

DEVICE FOR ADJUSTABLY SPACING MEMBERS

Donald H. Rogers and Vincenc Schilha, Fanwood, N. J., assignors to Western Electric Company, Incorporated, New York, N. Y., a corporation of New York Application April 1, 1944, Serial No. 529,224

6 Claims. (Cl. 287—52)

This invention relates to a device for adjustably spacing members, and more particularly to devices for adjustably spacing two or more members mounted to be otherwise slidable along an elongated cylindrical support.

As an illustrative case in which the employment of the invention may be especially useful, there may be cited the generally well known air condensers employed in various branches of the electrical arts and especially in communications apparatus, although there are many other instances in other arts where the invention may be usefully adopted. An air condenser comprises, basically, a plurality of parallel laminar or tabular members of metal spaced with predetermined intervals between the members, and a second similar plurality of similar members extending between but out of contact with the members of the first plurality. The two pluralities of metal plates insulated electrically from each other may then form the electrodes of an electrical condenser. The electrical capacitance of such a condenser will depend upon the total area of each set of plates overlapped by the other set and also upon the distances between neighboring faces of neighboring plates. On the other hand, the thickness of the individual plates is electrically negligible within wide limits. In the manufacture of such condensers, a plurality of plates of identically similar size and shape may be punched or stamped from a suitably thick sheet of suitable metal and the burrs removed from the edges. Such plates will ordinarily also have identically similar perforations formed at the same time. These plates are then assembled on a supporting shaft or bar and with suitable spacing means between consecutive members; and the whole is then clamped into a rigid unit, e. g. by nuts screwed onto the threaded ends of the shaft or bar. If the plates thus formed are of uniform thickness, the spacing means to go between them on the support can be preformed to space the plates the desired predetermined distance apart and the unit thus assembled will have the desired spatial relation to a corresponding assembly similarly created. But if the plates be of varying thickness, while they may be at a proposed distance from each other, they will not intercalate with the plates of a similarly formed assembly in regular fashion with equal and predetermined interspaces between neighboring faces of neighboring plates of the two assemblies. In normal times it may be possible to specify and obtain in the commercial market sheet metal of sufficiently correct and uniform thickness so that this condition does not arise; but, under the exigencies of wartime production of materials this is not generally possible. Furthermore, where extreme accuracy of prescribed capacitance is necessary, even the best of the peacetime commercial product may not be sufficiently invariant in thickness.

An object of the present invention is to provide a simple, reliable, cheap and accurately functioning device for adjustably spacing apart a pair of members supported on an elongated supporting member such as a rod, shaft or the like.

With the above and other objects in view, the invention may be embodied in a pair of coacting abuttable coaxially perforated members to receive an elongated supporting member therethrough and provided on their abuttable faces with matching cam surfaces so formed that relative rotation of the two perforated members on the support member will effect continuous variation of the overall dimension of the two perforated members along the support member.

Other objects and features of the invention will appear from the following detailed description of embodiments thereof taken in connection with the accompanying drawing, in which the same reference numerals are applied to identical parts in the several figures and in which Fig. 1 is a view in side elevation of one principal assembly of an air condenser in which the invention is employed;

Figure 1:
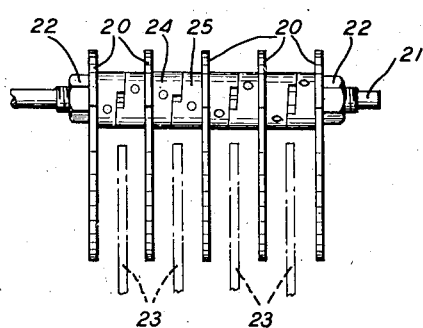
Figure 2:
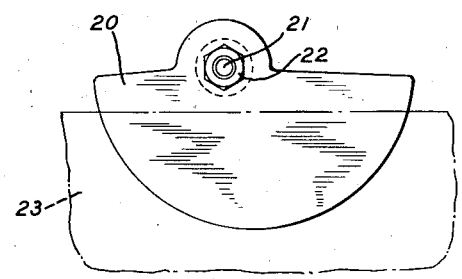
Fig. 2 is a corresponding view thereof in end elevation.

There is shown in Figs. 1 and 2 an assembly of parts for an air condenser electrode in which a plurality (here five) of sheet metal laminae or plates 20 each suitably perforated is supported on a rod or shaft 21 and locked thereon by nuts 22 engaging threaded portions of the shaft. Between each two consecutive plates 20 is positioned on the shaft 21 a pair of spacing members such as 24 and 25.

The members 24 and 25 are identical duplicates of each other. Each has an axial perforation, 26 or 27 respectively, to receive and pass the shaft 21 so that the members are freely rotatable thereon. The outer ends, 28 and 29, of the two members are plane and perpendicular to the axis of the shaft to lie flatly against the neighboring faces of the plates 20 separated by the members. The adjacent and mutually abutted end faces 30 and 31 of the members 24 and 25 are formed as matched and complementary cam surfaces so that, if there is relative rotation of the members 24 and 25 with respect to each other about their common axis, by turning one or the other or both on the shaft 21, the distance between their parallel outer end faces 28 and 29 will be continuously varied. In the particular form of spacing member shown in Figs. 1, 2 and 3, the faces 30 and 31 are formed to match the helical surface of one turn of a square threaded screw face. Thus when the two stop shoulders 32 and 33 are in contact, the overall length of the pair of spacing members 24 and 25 between the faces 28 and 29 is minimum, while at just under three hundred and sixty degrees (360°) rotation of one with respect to the other, this overall length is maximum.

Figure 4:
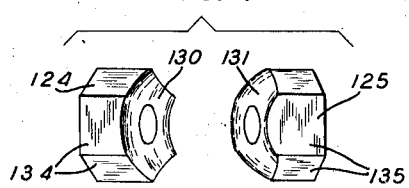
Fig. 4 is a similar view of a modified form of spacing members.

Fig. 4 shows a modified form of spacing members, 124 and 125, in which the mated cam faces, 130 and 131, are complementarily fluted in such a way that the maximum and minimum lengths correspond to positions of the members ninety degrees (90°) apart.

Figure 3:
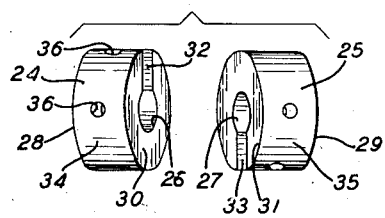
Fig. 3 is a detached enlarged view in central perspective of one pair of spacing members employed in the assembly of Figs. 1 and 2.

The outer circumferential surfaces, 34 and 35, or 134 and 135, may be formed in any suitable manner to be conveniently operated on to rotate one or the other or both on the shaft 21. In Fig. 3, these surfaces 34 and 35 are cylindrical and suitable radial bores 36 are formed in the bodies of the members to receive a pin spanner. In Fig. 4, the surfaces 134 and 135 are hexagonal prisms to receive an ordinary spanner.

There is indicated at 23 in Figs. 1 and 2, in dot and dash outline, the plurality of plates comprised in a complementary condenser electrode. It is believed to be self-evident from these figures, without need of any detailed discussion here, how the four pairs of spacing members on the shaft 21 and between neighboring pairs of the plates 20, may be employed to center each plate 23 accurately between the plates 20 on either side thereof. Assuming that the plates 23 are spaced mutually apart by the same kind of spacer member pairs, it will also, it is thought, be self-evident that the overall length of each of the two pluralities of plates may be adjusted within a considerable range while still keeping each plate 23 accurately midway between the plates 20 on either side thereof, by adjusting each of the several pairs of spacer members.

What is claimed is:

1. In an assembly comprising a plurality of elements formed to be slidable on an elongated support and mounted thereon, a pair of spacer members to be mounted on the said support between a pair of the said elements and formed with perforations to receive the said support therein with freedom of the members to rotate thereon, and mutually complementary smooth cams formed on the mutually abutted ends of the members and so shaped that the overall length of the two members may be continuously adjustably varied by relative rotation of the members with respect to each other on the support, in combination with means to lock the entire assembly together to hold the parts thereof against relative displacement.

2. In an assembly comprising a plurality of elements formed to be slidable on an elongated support and mounted thereon, a pair of spacer members to be mounted on the said support between a pair of the said elements and formed with perforations to receive the said support therein with freedom of the members to rotate thereon, mutually complementary smooth cams formed on the mutually abutted ends of the members and so shaped that the overall length of the two members may be continuously adjustably varied by relative rotation of the members with respect to each other on the support, and means formed on the circumferential portion of one member conditioned to coact with a suitable tool to effect rotation of the member on the support, in combination with clamping members mounted on the elongated support at either end of the assembly and conditioned to be forced together to lock the entire assembly to lock the parts thereof in an adjusted position against relative displacement.

3. In an assembly comprising a plurality of elements formed to be slidable on an elongated support and mounted thereon, a pair of spacer members to be mounted on the said support between a pair of the said elements and formed with perforations to receive the said support therein with freedom of the members to rotate thereon, and mutually complementary smooth helical cams formed on the mutually abutted ends of the members and so shaped that the overall length of the two members may be continuously adjustably varied by relative rotation of the members with respect to each other on the support, in combination with clamping members mounted on the elongated support at either end of the assembly and movable on the support to compress the assembly of elements and spacer members to lock the same in an adjusted position against relative displacement.

4. In an assembly comprising a plurality of elements formed to be slidable on an elongated support and mounted thereon, a pair of spacer members to be mounted on the said support between a pair of the said elements and formed with perforations to receive the said support therein with freedom of the members to rotate thereon, mutually complementary smooth helical cams formed on the mutually abutted ends of the members and so shaped that the overall length of the two members may be continuously adjustably varied by relative rotation of the members with respect to each other on the support, and means formed on the circumferential portion of one member conditioned to coact with a suitable tool to effect rotation of the member on the support, in combination with threaded clamping members mounted on correspondingly threaded portions of the support at either end of the assembly of elements and spacing members to be rotatably advanceable on the support, to clamp the assembly and lock the parts thereof against relative displacement.

5. In an electrical condenser, a plate assembly comprising a metal shaft threaded near both ends, a plurality of laminar metal fins mounted to be slidable on the shaft and to stand at right angles thereto, a pair of spacer members mounted on the shaft between two neighboring fins and rotatable on the shaft, mutually complementary smooth cams formed on the mutually abutted faces of the spacer members and so shaped that the overall length of the two members may be continuously adjustably varied by relative rotation of the two members with respect to each other on the shaft, and clamp nuts mounted on the threaded portions of the shaft to receive the assembly of fins and spacer members therebetween and lock the same in an adjusted position against relative displacement of the parts thereof.

6. In an electrical condenser, a plate assembly comprising a metal shaft threaded near both ends, a plurality of laminar metal fins mounted to be slidable on the shaft and to stand at right angles thereto, a pair of spacer members mounted on the shaft between each two neighboring fins and rotatable on the shaft, mutually complementary smooth cams formed on the mutually abutted faces of the spacer members and so shaped that the overall length of the two members may be continuously adjustably varied by relative rotation of the two members with respect to each other on the shaft, and clamp nuts mounted on the threaded portions of the shaft to receive the assembly of fins and spacer members therebetween and lock the same in an adjusted position against relative displacement of the parts thereof.

DONALD H. ROGERS.
VINCENC SCHILHA.